United States Patent [19]

Kishino

[11] Patent Number: 4,927,207

[45] Date of Patent: May 22, 1990

[54] GLASS CONSTRUCTION FOR AN AUTOMOBILE

[75] Inventor: Koji Kishino, Hiroshima, Japan

[73] Assignee: Mazada Motor Corporation, Hiroshima, Japan

[21] Appl. No.: 303,746

[22] Filed: Jan. 25, 1989

[30] Foreign Application Priority Data

Jan. 25, 1988 [JP] Japan .................................. 63-015531

[51] Int. Cl.$^5$ ............................................. B62D 35/00
[52] U.S. Cl. ...................................... 296/185; 49/348; 49/374; 49/227
[58] Field of Search ................................ 49/348–352, 49/374–378, 227; 296/146, 185

[56] References Cited

U.S. PATENT DOCUMENTS

| | | | |
|---|---|---|---|
| 3,844,064 | 10/1974 | Yamaha et al. | 49/348 |
| 4,219,968 | 9/1980 | Sakai et al. | 49/350 X |
| 4,420,906 | 12/1983 | Pickles | 49/349 X |
| 4,658,546 | 4/1987 | Moriyama | 49/227 X |
| 4,730,414 | 3/1988 | Nakamura et al. | 49/349 X |

FOREIGN PATENT DOCUMENTS 3037397 2/1985 Fed. Rep. of Germany .

Primary Examiner—Philip C. Kannan
Attorney, Agent, or Firm—Wenderoth, Lind & Ponack

[57] ABSTRACT

A windowpane for an automobile includes a inner and outer surface having a curvature corresponding to a portion of a surface of one of either a cylindrical body or a conical body. The windowpane is mounted in the automobile such that one of either a front edge or a rear edge thereof is positioned closer to a vertical plane extending vertically from a front center portion to a rear center portion of the automobile. Furthermore, a central axis of curvature defined by the curvature of the windowpane is slanted relative to a horizontal plane of the automobile. The windowpane is mounted in the side door of the automobile. The side door can be one of either a front side door or a rear side door and can be one of either a sash type door, an inner sash type door, or a sashless type door.

25 Claims, 11 Drawing Sheets

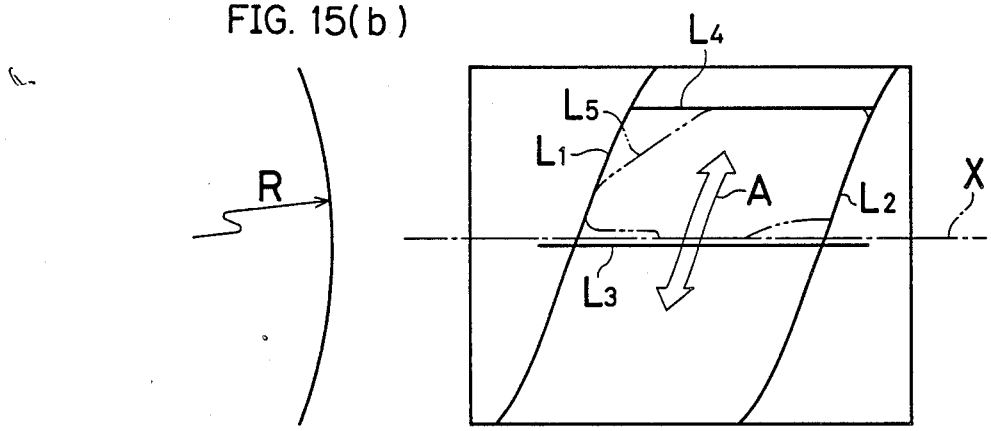
FIG. 15(a)
FIG. 15(b)
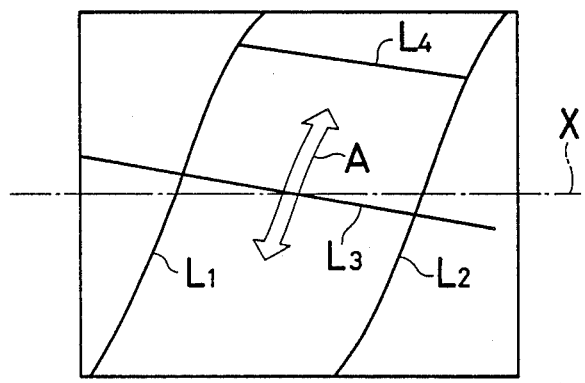
FIG. 16

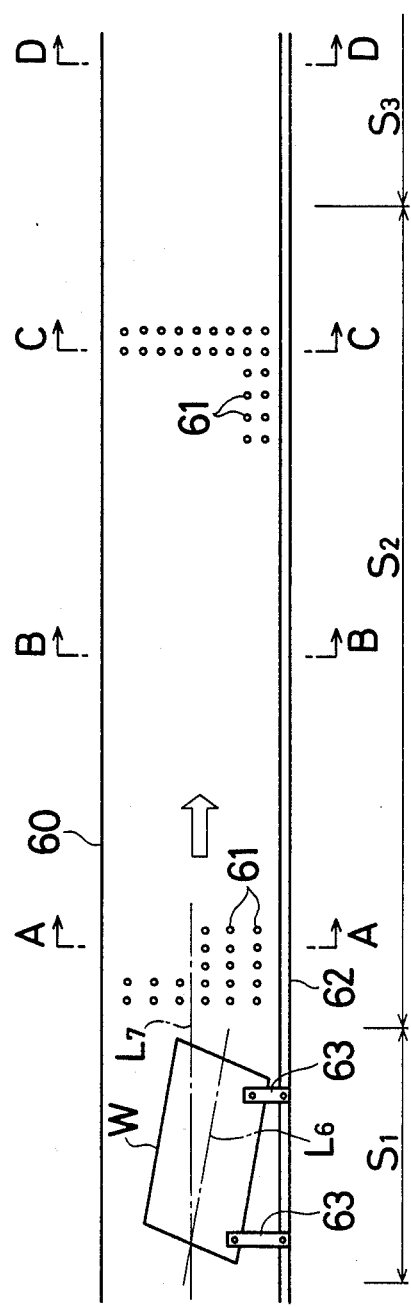
FIG. 22
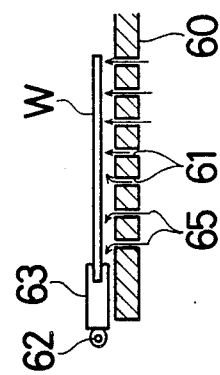
FIG. 23
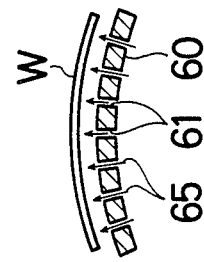
FIG. 24
FIG. 25
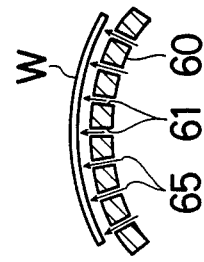
FIG. 26

GLASS CONSTRUCTION FOR AN AUTOMOBILE

BACKGROUND OF THE INVENTION

1. Field of the Invention

This invention relates to the glass construction of an automobile, and more particularly, to an improvement of the glass construction when using two-dimensional glass.

2. Description of the Prior Art

Conventionally, two-directional curved glass which curves relative to a vertical direction is generally used in an automobile for the purpose of improving the aerodynamic characteristics and outward appearance of the automobile. Two-directional curved glass used for side doors, for example, which is set movably in a vertical direction, and in which guide rails, door sashes, etc. guide the glass in an upward-and-downward motion, is almost the same in structure as plane glass construction and in an upward-and-downward direction is movable in almost the same curvature as the curvature of glass.

The use of three-directional curved glass has recently been suggested for the front side doors which not only curves in up-and-down direction but also curves in a direction at a right angle to the up-and-down direction so that when the door glass is in a raised position (closed position), an upper part on a front edge side of the door glass is located more inwardly of a car body than an upper part on a rear edge side, thereby improving the aerodynamic characteristics and outward appearance of the automobile (refer to West-German Patent No. 3037397, etc.).

Three-directional curved glass involves higher manufacturing costs than plane glass and two-directional curved glass and requires the use of guide rails, door sashes, etc. of special construction due to the difference in shape between a front edge portion and a rear edge portion of the glass and other factors. Thus, it is feared that use of three-directional curved glass lacks reliability in respect of sealability and other points.

SUMMARY OF THE INVENTION

An object of the present invention is to improve the aerodynamic characteristics and outward appearance of the side door glass for an automobile by using two-directional curved glass which is so designed that either one of its front edge portion and rear edge portions is positioned more inwardly of a car body than the other as in the case of three-directional curved glass, thereby improving the aerodynamic characteristics and outward appearance of the automobile. Two-directional curve glass in this case is defined as a sheet glass that curves only in one direction such that the connection of a series of centers of curvature of a plurality of adjacent cross-section arcs of the glass would form a central axis of curvature which is a straight line. More specifically, a sheet glass obtained by cutting out a part of a cylindrical glass or a conical glass. On the other hand, a three-directional curved glass is defined as a sheet glass which curves in plural directions and does not include the two-directional curved glass as defined above.

In order to attain the above object, the present invention premises the glass construction for an automobile having glass at the side of a car body, more particularly, the glass is a two-directional curved glass curved in the vertical direction, having such structure that its central axis of curvature is set slanted in a vertical direction in relation to at least a horizontal line in a longitudinal direction of a car body and either one of its front edge portion and rear edge portion is positioned more inwardly of a car body than the other.

In the present invention having the above glass construction, the central axis of curvature of the two-directional curved glass curved in a vertical direction slants in vertical direction in the relation to the horizontal line in longitudinal direction of a car body and therefore when viewed from the direction along the horizontal line, the upper end edge portion of the two-directional curved glass which is substantially in parallel with said horizontal line presents such an appearance that either one of its front edge and rear edge is positioned more inwardly of a car body than the other. This enables an improvement in the aerodynamic characteristics and outward appearance as in the case of using three-directional curved glass, while ensuring a reduction in glass manufacturing costs and an improved reliability in sealability, etc.

Another object of the present invention is to realize such improvements of aerodynamic characteristics and outward appearance as mentioned above even in the case where a boundary line between a two-directional curved glass and a body at the underside of said glass is not in parallel with a horizontal line.

In order to attain the above object, on the premise that the present invention is the construction of glass at the side of a car body, two-directional curved glass is so set that its central axis of curvature slants in a curved direction of the two-directional curved glass in relation to at least the line along an end edge of said two-directional curved glass and either one of a front edge and a rear edge of said two-directional curved glass is positioned more inwardly of a car body than the other.

In the present invention having the above glass construction, as the central axis of curvature of the two-directional curved glass slants in a curved direction of the two-directional curved glass in relation to a line along one end edge (for example, a lower end edge or an upper end edge) of said two-directional curved glass, when viewed from the direction along said one end edge (direction along a boundary line between said two-directional curved glass and a body at the underside of said two-directional curved glass), an upper end edge portion of the two-directional curved glass which is substantially in parallel with that direction presents such an appearance that either one of its front edge and rear edge is positioned more inwardly of a car body than the other. This indicates that it is possible to improve aerodynamic characteristics and outward appearance as in the preceding case.

The above objects and novel features of the present invention will be made more clear by reading the following description of the present invention, with reference to the accompanying drawings.

BRIEF DESCRIPTION OF THE DRAWINGS

The accompanying drawings show preferred embodiments of the present invention.

FIG. 1 through FIG. 5 show the first embodiment of the present invention, in which FIG. 1 is a front view of the front side door, FIG. 2 is a side view of the above front side door (however, in FIG. 1 and FIG. 2, each composing member is shown as if it were transparent to show the construction of a door glass), FIG. 3, FIG. 4 and FIG. 5 are cross sectional views, on an enlarged scale, taken along the line III—III, the line IV—IV and the line V—V respectively in FIG. 1;

FIG. 15 through FIG. 17 are explanatory drawings for explaining the reason why the central axis of curvature of a door glass is slanted, in which FIG. 15(a), FIG. 16 and FIG. 17(a) are plan views of a glass having a cylindrical surface, FIG. 15(b) is a left side view of FIG. 15(a), and FIG. 17(b) and FIG. 17(c) are a left side view and a top view respectively of FIG. 17(a);

FIG. 22 is a rough plan view of an apparatus to be used for processing a two-directional curved glass;

FIGS. 23, 24, 25 and 26 are cross sections, taken along the line A—A, the line B—B, the line C—C and the line D—D respectively in FIG. 22;

FIG. 28 is a type drawing of a door glass of the front side door, as seen from the front of a vehicle;

FIG. 29 through FIG. 31 show different modified embodiments, in which FIG. 29 and FIG. 30 are a back view and a plan view respectively of an automobile provided with a rear side glass according to the present invention and FIG. 31 is a cross section, on an enlarged scale, taken along the line XXXI—XXXI in FIG. 30;

DETAILED DESCRIPTION OF THE INVENTION

Preferred embodiments of the present invention will be described below, with reference to the accompanying drawings.

Figure 2:
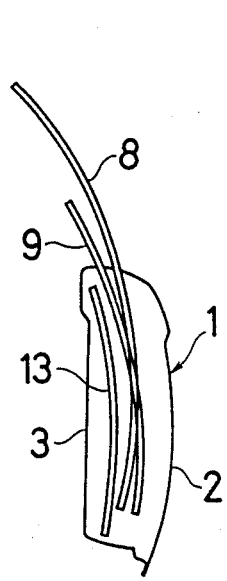
Figure 1:
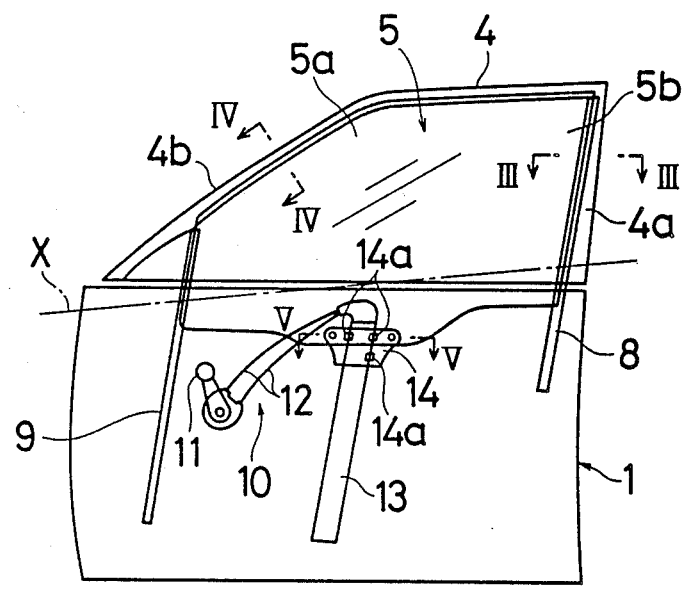
Figure 4:
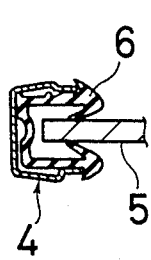
Figure 3:
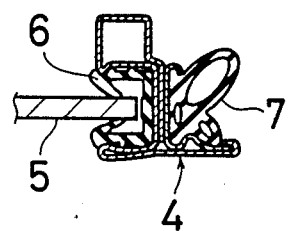

FIG. 1 and FIG. 2 show the first embodiment, in which the present invention is applied to the door glass construction of the general sash-type front side door. Reference numeral 1 designates a door body of the front side door, comprising an outer panel 2 and an inner panel 3. The door body 1 is provided with a sash door 4 projecting upwardly. As shown in FIG. 3 and FIG. 4, a door glass 5 is grasped at the circumferential edge thereof by the sash door 4 through the medium of a run channel 6. In FIG. 3, reference numeral 7 designates a weather strip mounted on the door sash 4. When the front side door is shut, the weather strip 4 makes contact with a car body (center pillar) for sealing.

A leg portion 4a at the rear of the door sash 4 includes a guide rail 8 which guides a rear edge of the door glass 5 in the up and down motion of the door glass 5. The guide rail 8 extends into the door body 1 and guides the door glass 5 as it is conveyed in an upward-and-downward motion. Connected to an inclined leg portion 4b in the front of the door sash 4 is a guide rail 9 which guides a front edge of the door glass 5 as it is conveyed in an upward-and-downward motion. This guide rail 9 also extends deeply into the door body 1.

Figure 5:
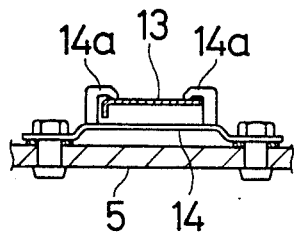

Reference numeral 10 designates a cable type driving means which conveys the door glass 5 fitted to the inner panel 3 of the door body 1 upward-and-downward. Although the composition of the driving means 10 is not illustrated fully in the drawing, it is so designed that when an operation handle 11 inside the car body is turned, its turning force is transmitted by a cable 12 as tractive force in vertical direction to the door glass 5, whereby the door glass 5 is caused to travel either upward or downward. Reference numeral 13 designates a guide member which is fitted to the inner panel 3 and extends substantially in a vertical direction. As shown in FIG. 5, the guide member 13 guides the door glass 5 in its upward-and-downward motion, in concert with a slider 14a of a plate 14 fitted to the center of a lower part of the door glass 5.

Figure 7:
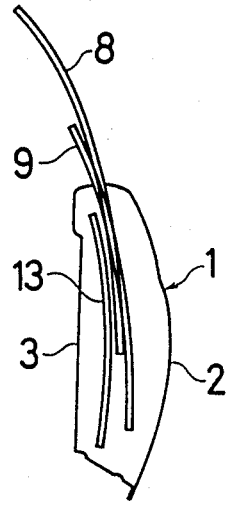
FIG. 6 through FIG. 9 show the second embodiment of the present invention, in which FIG. 6 corresponds to FIG. 1, FIG. 7 corresponds to FIG. 2, and FIG. 8 and FIG. 9 are cross sections, taken along the line VIII—VIII and the line IX—IX respectively in FIG. 6.
Figure 6:
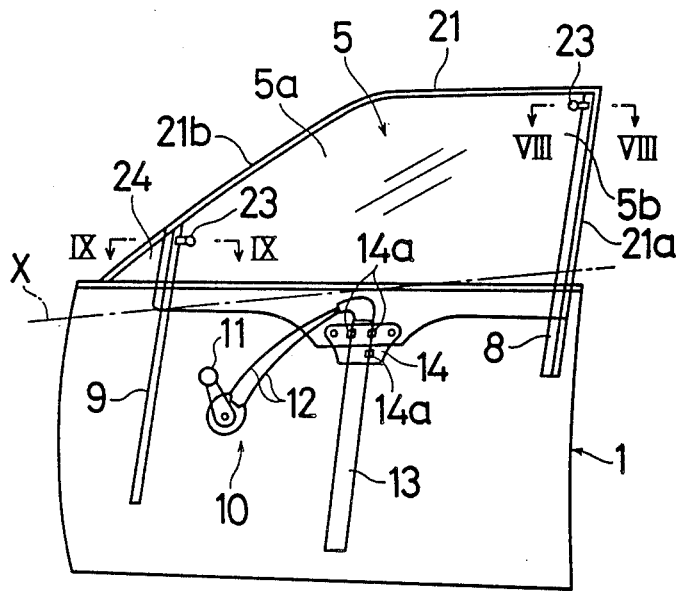
Figure 8:
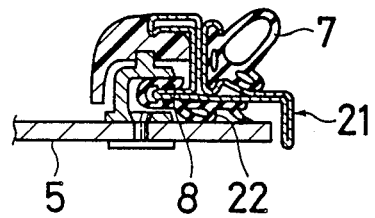

FIG. 6 and FIG. 7 show the second embodiment of the present invention, in which the present invention is applied to the door glass construction of the inner sash type front side door. In the inner sash type front side door, as shown in FIG. 8 a door sash 21 which composes a window frame is positioned inwardly of the door glass 5, when the window glass 5 is in its upward position (namely, the window frame is in closed state), and is incorporated in the door body 1. The door sash 21 is provided with a weather strip 22 which makes contact with a circumferential edge part of the inner surface of the door glass 5 for sealing.

Figure 9:
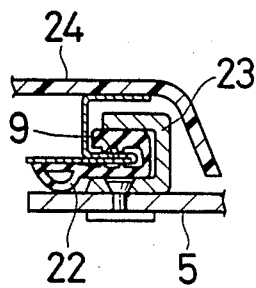

Similar to the case of the first embodiment, a leg portion 21a at the rear of the door sash 21 includes the guide rail 8 extending into the door body 1 and a leg portion 21b slanting at the front of the door sash 21 is connected with a top end of the guide rail 9 extending deeply into the door body 1. On the other hand, as illustrated in FIG. 8 and FIG. 9, sliders 23 which are slidable along the guide rails 8, 9 are fitted to a rear edge upper part and a front edge upper part respectively. By the cooperative action of the sliders 23 and the guide rails 8, 9, the door glass 5 is guided in its upward-and-downward motion. Reference numeral 24 designates a corner member provided at a corner part formed between the door body 1 and the leg portion 21b at the front of the door sash 21. The front side door and remaining composition are the same as in the case of the first embodiment. Like reference numerals are given to the like members and explanation of them is omitted.

Figure 11:
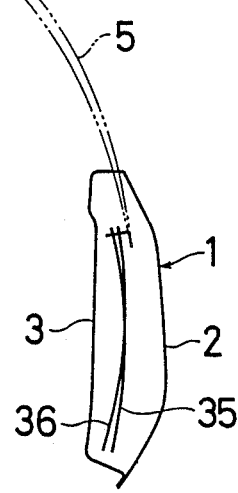
FIG. 10 through FIG. 13 show the third embodiment, in which FIG. 10 corresponds to FIG. 1, FIG. 11 corresponds to FIG. 2 and FIG. 12 and FIG. 13 are cross sectional views on an enlarged scale, taken along the line XII—XII and the line XIII—XIII respectively in FIG. 10.
Figure 10:
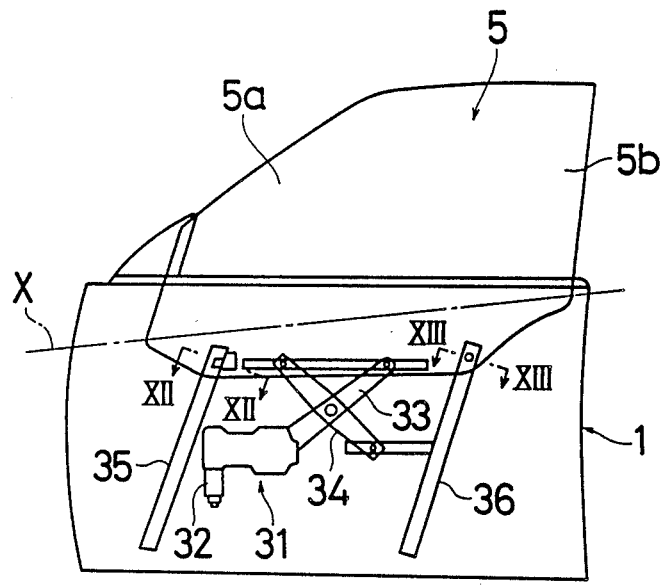

FIG. 10 and FIG. 11 show the third embodiment, in which the glass construction of the present invention is applied to the front side door of hard top type (sashless type). In this hard top front side door, a driving means 31 which conveys the door glass in an upward-and-downward motion is an X arm type incorporated in the door body 1. By the operation of a driving motor 32, a main arm 33 and a subarm 34 connected to each other in X-shape do the motion of changing relative angles, whereby the door glass 5 is conveyed in an upward-and-downward motion.

Figure 13:
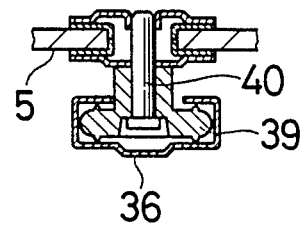
Figure 12:
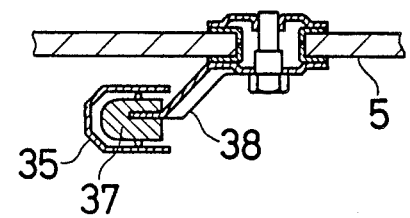

Provided in the door body 1 are guide rails 35, 36 which extend substantially in a vertical direction on both sides (in front and the rear respectively) of the driving means 31. On the other hand, as shown in FIG. 12, a slider 37 slidable along the guide rail 35 in the front is fitted at a lower edge front part of the door glass 5 through the medium of a fitting member 38, and as shown in FIG. 13, a roller 39 which is rollable in the guide rail 36 is fitted at a lower edge rear part of the door glass 5 through the medium of a support axis 40. By this arrangement, the door glass 5 is guided in its upward-and-downward motion along the guide rails 35, 36.

Figure 14:
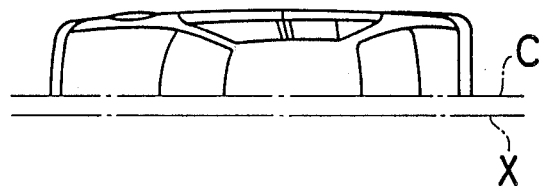
FIG. 14 is a plan view, showing the right half of an automobile for explaining the position of a central axis of curvature of a glass in the first, second and the third embodiments.

In the door glass construction in each of the above first, second and third embodiments, the door glass 5 is a two-directional curved glass which is curved inwardly of the car interior in its up-and-down direction (direction in which the guide rails 8, 9 or 35, 36 extend). As shown in FIG. 1, FIG. 6 and FIG. 10, the central axis X of curvature is set at the level near the boundary line between the door glass 5 and the door body 1. Also, the central axis X of curvature slants frontwardly and downwardly and, as shown in FIG. 14, is set in parallel with a center line C of the width in longitudinal direction of a car body. Two front and rear guide rails 8, 9 or 35, 36 which guide the two-directional curved door glass 5 in its up-and-down motion are also curved inwardly of a car room in a direction corresponding to the two-directional curved glass 5 and their curvature is set at almost the same curvature as the curvature of the door glass 5. On the other hand, the curvature centers of two guide rails 8, 9 or 35, 36 are set at different positions so as to correspond to the difference in the position of curvature center in the vertical direction between the front part and the rear part of the two-directional curved glass, namely, the position of curvature center of the guide rail 9 or 35 in the front is set lower than that of the guide rail 8 or 36.

In the case of the glass construction in the first and the second embodiments, the guide member 13 which guides the door glass 5 at its center in the longitudinal direction in its up-and-down motion is also curved inwardly of the car interior at almost the same curvature as the two-directional curved glass 5 and the position of its curvature center is set substantially at an intermediate position between the positions of curvature centers of both guide rails 8, 9.

In the door glass construction in each of the above embodiments, the reason for the central axis of curvature of the two-directional curved glass 5 being set slanted frontwardly and downwardly in the relation to a horizontal line in longitudinal direction of a car body is explained below, with reference to FIG. 15 and FIG. 17. FIG. 15(a) and FIG. 15(b) are a plan view and a left side view respectively of a glass having a cylindrical surface with a radius of curvature R. Curved lines $L_1$, $L_2$ on the glass surface in parallel with each other are curves which will turn straight lines when the curved surface is expanded into the plane. Therefore, in the case where a front edge and a rear edge of the door glass are set in such a fashion that they are positioned on the curved lines $L_1$, $L_2$ respectively, when the door glass is moved up and down it is possible to slide it to some extent in the longitudinal direction of a car body, as shown by the arrow A. Thus, in the conventional door glass construction for an automobile using the two-directional curved glass, a line along the lower end edge $L_3$ of the door glass is set in parallel with the central axis X of curvature (central axis of a cylinder) of the glass and an upper edge of the door glass is set on a straight line $L_4$ which is in parallel with the straight line $L_3$. Under this arrangement, the door glass is taken out of the area enclosed by the two straight lines $L_3$, $L_4$ and the two curved lines $L_1$, $L_2$, as shown by a virtual line $L_5$.

Instead of the above method of taking out a door glass, the following method is available. As shown in FIG. 16, straight lines $L_3$ and $L_4$ are set slanted in relation to the central axis X of curvature of a glass and the glass is taken out of the area enclosed by the two straight lines $L_3$, $L_4$ and the two curved lines $L_1$, $L_2$. In this case, as a front edge and a rear edge of the door glass are set to be positioned on the curved lines $L_1$, $L_2$ respectively as stated before, it is of course possible to slide the door glass in the longitudinal direction of a car body when the door glass moves up and down.

Figure 17C:
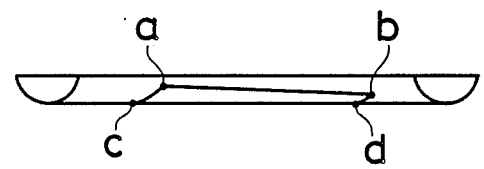
Figure 17B:
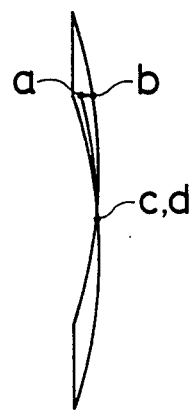
Figure 17A:
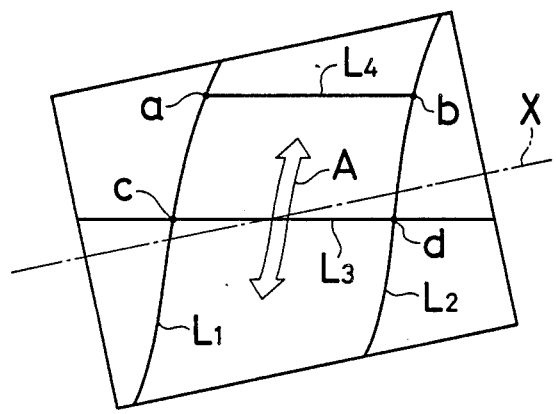

FIG. 17(a) shows the state where the glass shown in FIG. 16 is turned to bring the straight line $L_3$ to a level (the state where the central axis X of curvature of the glass is positioned downward gradually as it moves toward the left side). FIG. 17(b) and FIG. 17(c) are a left side view and a top view respectively of the glass which is in the state shown in FIG. 17(a). As can be seen from FIGS. 17(a), (b) and (c), when a comparison is made between the intersecting point "a" of the straight line $L_4$ and the curved line $L_1$ (the point corresponding to a front edge upper part side of the door glass 5) and the intersecting point "b" of the straight line $L_4$ and the curved line $L_2$ (the point corresponding to a rear edge upper part side of the door glass 5), the intersecting point "a" is more upward than the intersecting point "b" in relation to the central axis X of curvature of the glass and therefore the former is positioned more inwardly of the curved direction of the glass. The intersecting point "c" of the straight line $L_3$ and the curved line $L_1$ (the point corresponding to a front edge lower part side of the door glass 5) and the intersecting point "d" of the straight line $L_3$ and the curved line $L_2$ (the point corresponding to a rear edge lower part side of the door glass 5) are in almost the same position in relation to the curved direction of the glass.

As is obvious from the above explanation, setting of the central axis X of curvature of the two-dimensional glass 5 slanted frontwardly and downwardly in relation to a horizontal line in longitudinal direction of a car body is intended to position the front edge upper part 5a of the door glass 5 more inwardly of the curved direction of the door glass 5 (inwardly of a car body) than the rear edge upper part 5b.

Figure 18:
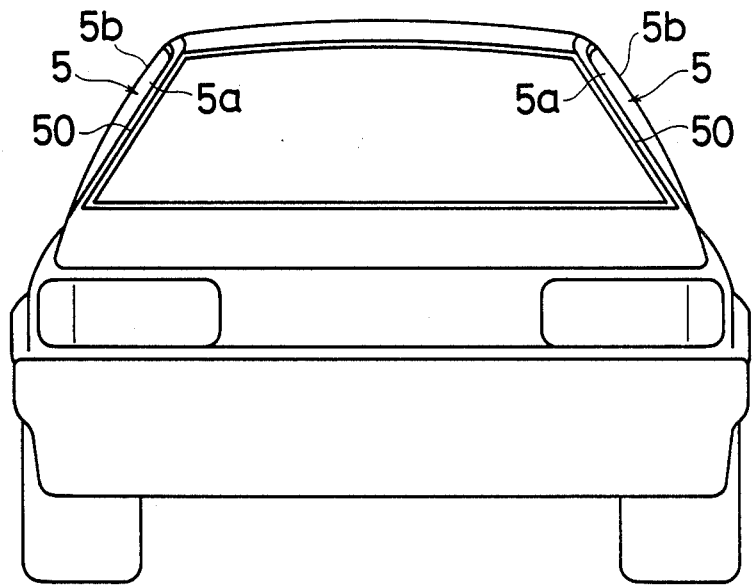
FIG. 18 and FIG. 19 are a front view and a plan view respectively of an automobile provided with a door glass construction of a front side door according to the present invention.
Figure 19:
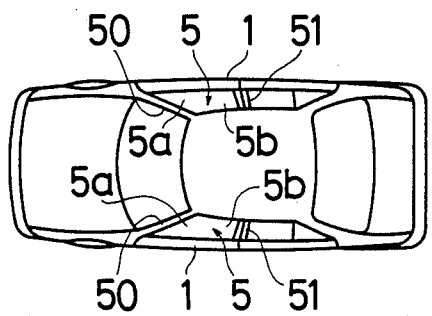
Figure 20:
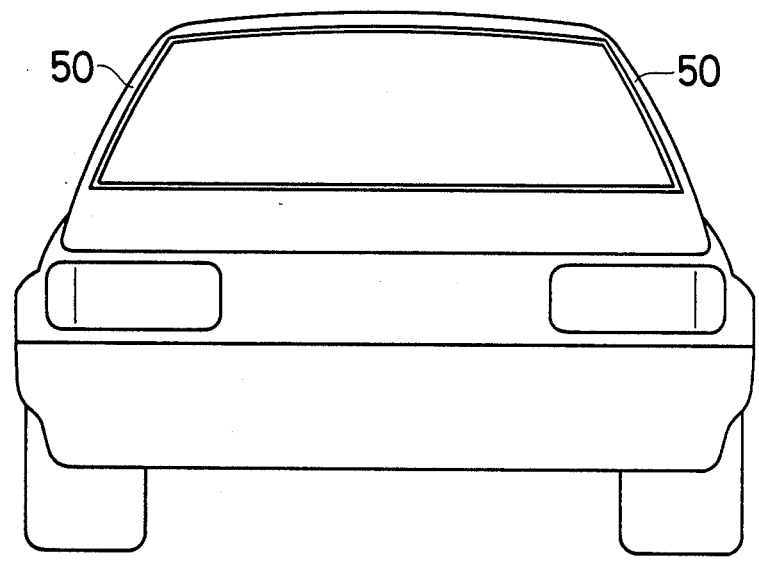
FIG. 20 and FIG. 21 are a front view and a plan view respectively of a conventional automobile.
Figure 21:
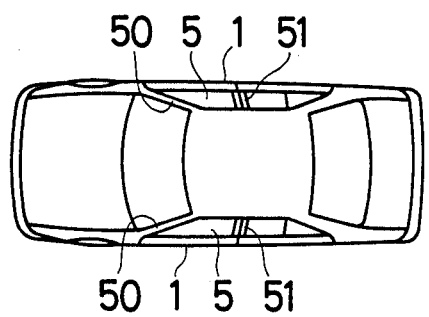

In the case where the front edge upper part 5a of the door glass 5 is positioned more inwardly of a car body than the rear edge upper part 5b as mentioned above, as shown in FIG. 18 and FIG. 19 a conspicuous tumble home design (the door glass 5 leans deeply inwardly of the car body at the upper part of a front pillar 50) is realized, with the result being that the outward appearance and aerodynamic characteristics of the car can be improved. For comparison purposes of the outward appearance of automobiles, an automobile provided with the conventional two-directional curved glass is shown in FIG. 20 and FIG. 21 which correspond to FIG. 18 and FIG. 19 respectively.

In the above case, as the central axis X of curvature of the two-directional curved glass 5 was set at a level near the boundary line between the door glass 5 and the door body 1, the surface of the door glass 5 is connected smoothly to the surface of the door body 1, with the result of formation of an attractive body line, free from the difference in level.

Also, in the above case the door glass 5 at about the top part of the center pillar 51 is in almost the same position as in the case of a conventional automobile and therefore there is no fear that occupancy, space worsens.

Since the above door glass 5 is a two-directional curved glass curved only in its up and down direction, no special consideration is required for the design and use of the door glass 5, the guide rails 8, 9 (or 35, 36), the door sash 4 (or 21), the driving means 10 (or 32), etc. as in the case of the three-directional curved glass and reliability of up-and-down motion, sealability, etc. is increased. Moreover, manufacturing cost of the door glass 5 is lower than that of the three-directional curved glass.

A specific example of the method of manufacturing the two-directional curved glass 5, especially the method of processing a flat glass into a two-directional curved glass, is explained below, with reference to FIG. 22. In FIG. 22, reference numeral 60 designates a bed having the required width and extending in one direction. Many blowoff holes from which hot air and cool air are blown out are made in the bed 60 in checkered-shape. Reference numeral 62 designates a wire laid along a lengthwise direction of the bed 60. The wire 62 is so designed that it conveys a glass W grasped by clamps 63 on the bed 60 in the arrow direction. The bed 60 is formed in flat board-shape at the upstream side where a glass W is loaded (refer to FIG. 23) but is curved in transversal direction at the downstream portion or the curve forming area $S_2$ and its curvature is enlarged gradually toward the downstream side in the direction of conveying the glass W. At a cooling area $S_3$ which is adjacent to the downstream portion of the curve forming area $S_2$ is also curved in transversal direction at almost the same curvature as the curvature at the downstream portion (refer to FIG. 26).

In the case of processing a flat glass into a two-directional curved two-directional curved glass, the flat glass W of substantially parallelogrammatic shape is placed on the bed 60 and after the flat glass W is grasped by the clamps 63, the flat glass W is conveyed by the wire 62 to the side of the curve forming area $S_2$. When placing the flat glass W on the bed 60, it is place on the bed 60 in the state that a center $L_6$ of the flat glass W is slanted in relation to a center line $L_7$ of the bed 60.

At the curve forming area $S_2$, the glass W on the bed 60 is heated by hot air 65 flown out of the blowoff holes 61. At this time, the glass W is put in such state that it keeps a certain clearance with the bed 60 by the hot air 65. As the bed 60 is formed in such a curved surface that the curvature grows larger gradually toward the downstream side in conveying direction of the glass W, the glass W is formed into a two-directional curved glass whose curvature is enlarged gradually as it is conveyed toward the downstream side of the curve forming area $S_2$.

At a cooling area $S_3$ of the bed 60, the glass W which was formed into a two-directional curved glass is cooled abruptly and is strengthened by cooling air 66 blown out of the blowoff holes 61. Thus, a series of process from the flat glass to the two-directional curved glass terminates.

Figure 27:
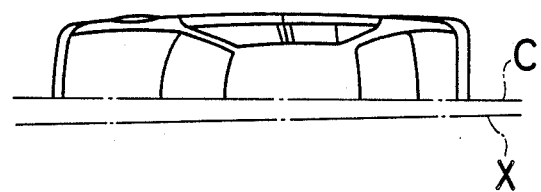
FIG. 27 and FIG. 28 show modified embodiments, in which FIG. 27 corresponds to FIG. 14
Figure 28:
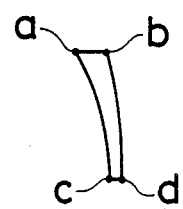

The present invention is not limited to the above first, second and third embodiments but includes other various modified embodiments. For example, in the door glass construction of the front side door in each of the above embodiments, the central axis X of curvature of the two-directional curved glass 5 is slanted frontwardly and downwardly in relation to a horizontal line in longitudinal direction of a car body but as shown in FIG. 27, it is possible to adopt such composition that while the central axis X is slanted frontwardly and downwardly, it is shifted towards the inside of a car body as it goes frontwardly and is slanted in the width direction in relation to the width center line C in longitudinal direction of a car body. In this case, the state of the door glass as seen from the front of a car body is as shown in FIG. 28, namely, the whole front edge of the door glass is positioned more inwardly of a car body than the rear edge and has the effect of facilitating the processing of rounding from the windshield. In FIG. 28, corresponding symbols are given to four corner parts for the purpose of comparison with FIG. 17(b).

In each of the above embodiments, mention is made of the case where the present invention is applied to the door glass construction of the front side door of an automobile but the present invention is also applicable to the door glass construction of the rear side door of an automobile or to the glass construction (other than the door glass) to be provided at the side of a car body. In the case where the present invention is applied to the door glass construction of the rear side door, it is so designed that the central axis X of curvature of the two-directional curved door glass is set slanted rearwardly and downwardly in relation to a horizontal line in longitudinal direction of a car body (contrary to the case of the door glass construction of the front side door) and a rear edge upper part of the door glass is positioned more inwardly of a car body than a front edge upper part when the door glass is in upward position.

Figure 29:
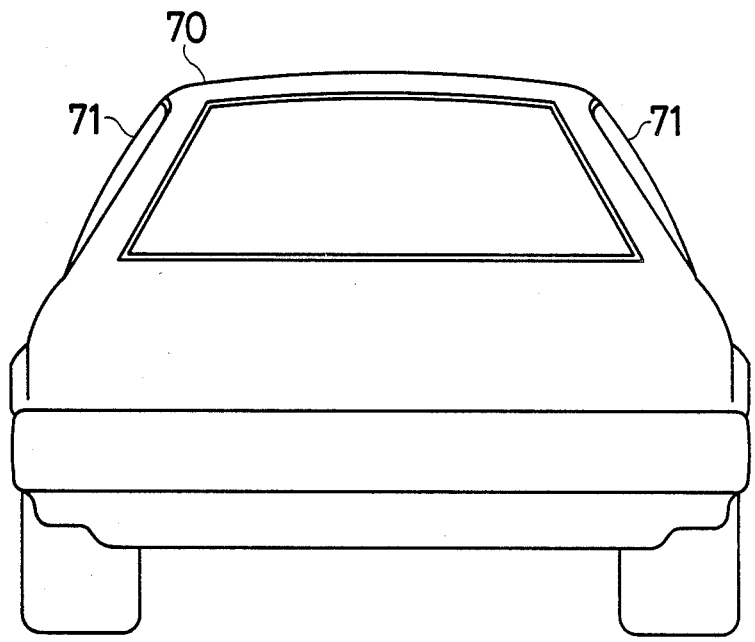
Figure 31:
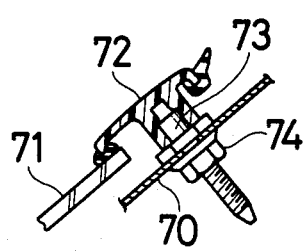
Figure 30:
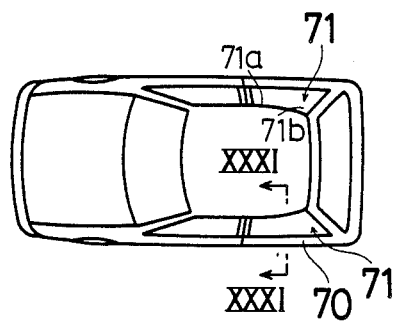

The present invention is also applicable to the glass construction of non-up and down motion type. FIGS. 29, 30 and 31 show an embodiment of this case which is applied to a rear quarter window glass. In the side of a rear part of a body 70, a stud bolt 73, together with a nut 74, are fixed at three portions. At the top of the three stud bolts 73, a quarter garnish 72 is fixed. Through the medium of this quarter garnish 72, a window glass 71 comprising a two-dimensional glass is fitted to the body 70. This quarter window glass 71 is so designed that it is set slanted rearwardly and downwardly in relation to a horizontal line in longitudinal direction of a car body and a rear edge upper part 71b of the quarter window glass 71 is positioned more inwardly of a front edge upper part 71a.

Figure 32:
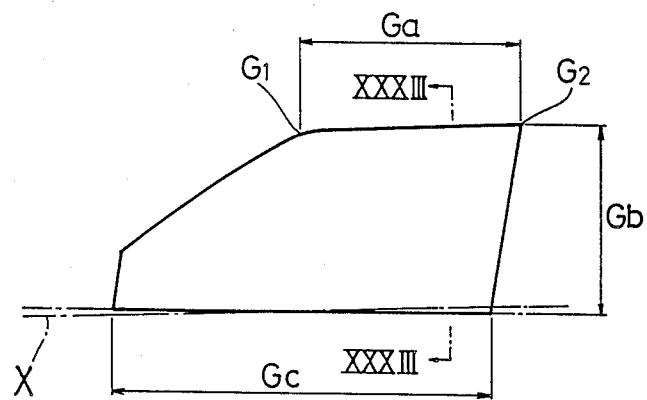
FIG. 32 is a plan view, showing actual measurements of the door glass of the front side door.
Figure 33:
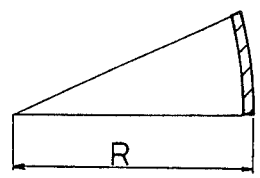
FIG. 33 is a part of the cross section, on an enlarged scale, taken along the line XXXIII—XXXIII in FIG. 32.

In each of the above embodiments, a boundary line between the two-directional curved glass and the body at the underside of said glass is substantially in parallel with a horizontal line, but the present invention in also applicable to the case where the boundary line is not in parallel with a horizontal line. In this case, the central axis of curvature of the two-directional curved glass should be set slanted in curved direction of the two-directional curved glass in relation to at least a line along one end edge of the two-directional curved glass and either one of a front edge and a rear edge of the two-directional curved glass should be positioned more inwardly of a car body than the other, when seen from the direction along said one end edge (direction along said boundary line). In each of the above drawings, in order to facilitate the understanding an example of the case where the angle of inclination of the central axis X of curvature in relation to a horizontal line in longitudinal direction of a car body is large is illustrated but as a matter of fact, a satisfactory effect can be obtained practically even in the case of a smaller angle of inclination than the above. For example, In the case of those shown in FIG. 32 and FIG. 33 where Ga=500 mm, Gb=400 mm, Gc=1,000 mm, radius of curvature R≈1,200 mm and the angle of inclination≈3 degrees, the point $G_1$ at the front edge upper part is positioned more inwardly of a car body than the point $G_2$ at the rear edge upper part by 10 mm. In this case, aerodynamic characteristics and outward appearance usually obtained by the use of three-directional curved glass can be obtained satisfactorily. This dimension is varied by each value, $G_A$, $G_B$, $G_C$, R and the angle of inclinination.

In each of the above embodiments, the door glass is taken out of a cylindrical glass but may be taken out of a conical glass.

What is claimed is:

1. In an automobile having a windowpane, the automobile defining a central vertical plane extending longitudinally and vertically through the automobile from a front center portion to a rear center portion of the automobile, and further defining a horizontal plane extending horizontally relative to the automobile along a bottom portion of the automobile, the improvement comprising:

said windowpane having an inner and an outer surface and a front edge and a rear edge, said inner and said outer surface each having a curvature corresponding to a portion of a surface of one of a cylindrical body and a conical body, and, said windowpane being mounted in the automobile such that one of said front edge and said rear edge is positioned closer to the central vertical plane of the automobile relative to the other of said front edge and said rear edge, and such that a central axis of curvature defined by said curvature of said windowpane mounted in the automobile is slanted relative to the horizontal plane of the automobile.

2. In an automobile as recited in claim 1, wherein said central axis of curvature of said windowpane is parallel to the central vertical plane of the automobile.

3. In an automobile as recited in claim 2, wherein said windowpane further includes a top edge and a bottom edge, and wherein said central axis of curvature of said windowpane is slanted relative to at least one of said top edge and said bottom edge.

4. In an automobile as recited in claim 2, the improvement further comprising a side door comprising:

an inner and outer panel; a means for mounting said windowpane; a driving means for conveying said windowpane in an upward and downward motion; and first and second guide rails for respectively guiding at least a portion of said front edge and said rear edge of said windowpane as said windowpane is conveyed in an upward and downward motion, said first and second guide rails having a curvature substantially corresponding to said curvature of said windowpane and having centers of curvature positioned corresponding to said central axis of curvature of said windowpane.

5. In an automobile as recited in claim 4, wherein said central axis of curvature of said windowpane is at a level corresponding to a top portion of said side door when said windowpane is conveyed to an uppermost position.

6. In an automobile as recited in claim 4, wherein said side door is one of a sash type door, an inner sash type door, and a sashless type door.

7. In an automobile as recited in claim 6, wherein said side door is one of a front side door and a rear side door.

8. In an automobile as recited in claim 1, wherein said central axis of curvature of said windowpane is slanted relative to the central vertical plane of the automobile.

9. In an automobile as recited in claim 8, wherein said windowpane further includes a top edge and a bottom edge, and wherein said central axis of curvature of said windowpane is slanted relative to at least one of said top edge and said bottom edge.

10. In an automobile as recited in claim 8, the improvement further comprising a side door comprising:

an inner and outer panel; a means for mounting said windowpane; a driving means for conveying said windowpane in an upward and downward motion; and first and second guide rails for respectively guiding at least a portion of said front edge and said rear edge of said windowpane as said windowpane is conveyed in an upward and downward motion, said first and second guide rails having a curvature substantially corresponding to said curvature of said windowpane and having centers of curvature positioned corresponding to said central axis of curvature of said windowpane.

11. In an automobile as recited in claim 10, wherein said central axis of curvature of said windowpane is at a level corresponding to a top portion of said side door when said windowpane is conveyed to an uppermost position.

12. In an automobile as recited in claim 10, wherein said side door is one of a sash type door, an inner sash type door, and a sashless type door.

13. In an automobile as recited in claim 12, wherein said side door is one of a front side door and a rear side door.

14. In an automobile as recited in claim 1, wherein said windowpane further includes a top edge and a bottom edge, and wherein said central axis of curvature of said windowpane is slanted relative to at least one of said top edge and said bottom edge.

15. In an automobile as recited in claim 1, the improvement further comprising a side door comprising:

an inner and outer panel; a means for mounting said windowpane; a driving means for conveying said windowpane in an upward and downward motion; and first and second guide rails for respectively guiding at least a portion of said front edge and said rear edge of said windowpane as said windowpane is conveyed in an upward and downward motion, said first and second guide rails having a curvature substantially corresponding to said curvature of said windowpane and having centers of curvature positioned corresponding to said central axis of curvature of said windowpane.

16. In an automobile as recited in claim 15, wherein said side door is one of a sash type door, an inner sash type door, and a sashless type door.

17. In an automobile as recited in claim 16, wherein said side door is one of a front side door and a rear side door.

18. In an automobile as recited in claim 15, wherein said side door is one of a front side door and a rear side door.

19. In an automobile as recited in claim 15, wherein said central axis of curvature of said windowpane is at a level corresponding to a top portion of said side door when said windowpane is conveyed to an uppermost position.

20. A windowpane for an automobile, the automobile defining a central vertical plane extending longitudinally and vertically through the automobile from a front center portion to a rear center portion of the automobile, and further defining a horizontal plane extending horizontally relative to the automobile along a bottom portion of the automobile, said windowpane comprising:
- an inner and an outer surface, said inner and said outer surface each having a curvature corresponding to a portion of a surface of one of a cylindrical body and a conical body;
- a front edge and a rear edge, wherein said windowpane is mountable in the automobile such taht one of said front edge and said rear edge is positioned closer to the central vertical plane of the automobile relative to the other of said front edge and said rear edge;

wherein said windowpane is mountable in the automobile such that a central axis of curvature defined by the curvature of said windowpane is slanted relative to the horizontal plane of the automobile.

21. A windowpane as recited in claim 20, wherein said windowpane is mountable in the automobile such that said central axis of curvature is slanted relative to the central vertical plane of the automobile.

22. A windowpane as recited in claim 21, further comprising a top edge and a bottom edge, wherein said central axis of curvature is slanted relative to at least one of said top edge and said bottom edge.

23. A windowpane as recited in claim 20, further comprising a top edge and a bottom edge, wherein said central axis of curvature is slanted relative to at least one of said top edge and said bottom edge.

24. A windowpane as recited in claim 23, wherein said windowpane is mountable in the automobile such that said central axis of curvature is parallel to the central vertical plane of the automobile.

25. A windowpane as recited in claim 20, wherein said windowpane is mountable in the automobile such that said central axis of curvature is parallel to the central vertical plane of the automobile.

* * * * *